United States Patent [19]

Call

[11] 4,382,336
[45] May 10, 1983

[54] LINE LENGTH MEASURING DEVICE

[76] Inventor: Daniel D. Call, R.R. 1, Box 216, Athens, Wis. 54411

[21] Appl. No.: 218,626

[22] Filed: Dec. 22, 1980

Related U.S. Application Data

[63] Continuation-in-part of Ser. No. 88,009, Oct. 25, 1979, abandoned.

[51] Int. Cl.³ .............................................. G01B 3/12
[52] U.S. Cl. .............................. 33/134 R; 24/259 R; 43/25; 224/247
[58] Field of Search ...................... 43/25, 25.2; 33/129, 33/134 R; 224/247, 248; 24/257, 259 R; 248/226.5, 230

[56] References Cited

U.S. PATENT DOCUMENTS

| | | | |
|---|---|---|---|
| 1,540,394 | 6/1925 | Hall et al. ........................ | 248/226.5 |
| 1,598,003 | 8/1926 | Parrott ............................. | 24/259 R |
| 1,654,756 | 1/1928 | Ryan ................................ | 24/259 R |
| 2,209,318 | 7/1970 | Caldwell .......................... | 24/259 R |
| 2,637,112 | 5/1953 | Fontaine .......................... | 43/25 |
| 3,308,544 | 3/1967 | White .............................. | 33/134 R |

Primary Examiner—Stephen G. Kunin
Assistant Examiner—K. Bradford Adolphson
Attorney, Agent, or Firm—Mathew R. P. Perrone, Jr.

[57] ABSTRACT

Length of a line or, more particularly, depth of a fishing line is digitally indicated by a fishing depth gauge when a clip mounting bracket carries thereon a digital counter activated by cooperation between a fishing line paid out from a rod and a counter activating pulley serving to activate the digital counter. The digital counter is mounted at one end of the clip mounting bracket with a trifurcated rod mounting bracket at the other end of the clip mounting bracket, thereby completing the fishing line depth indicator.

7 Claims, 2 Drawing Figures

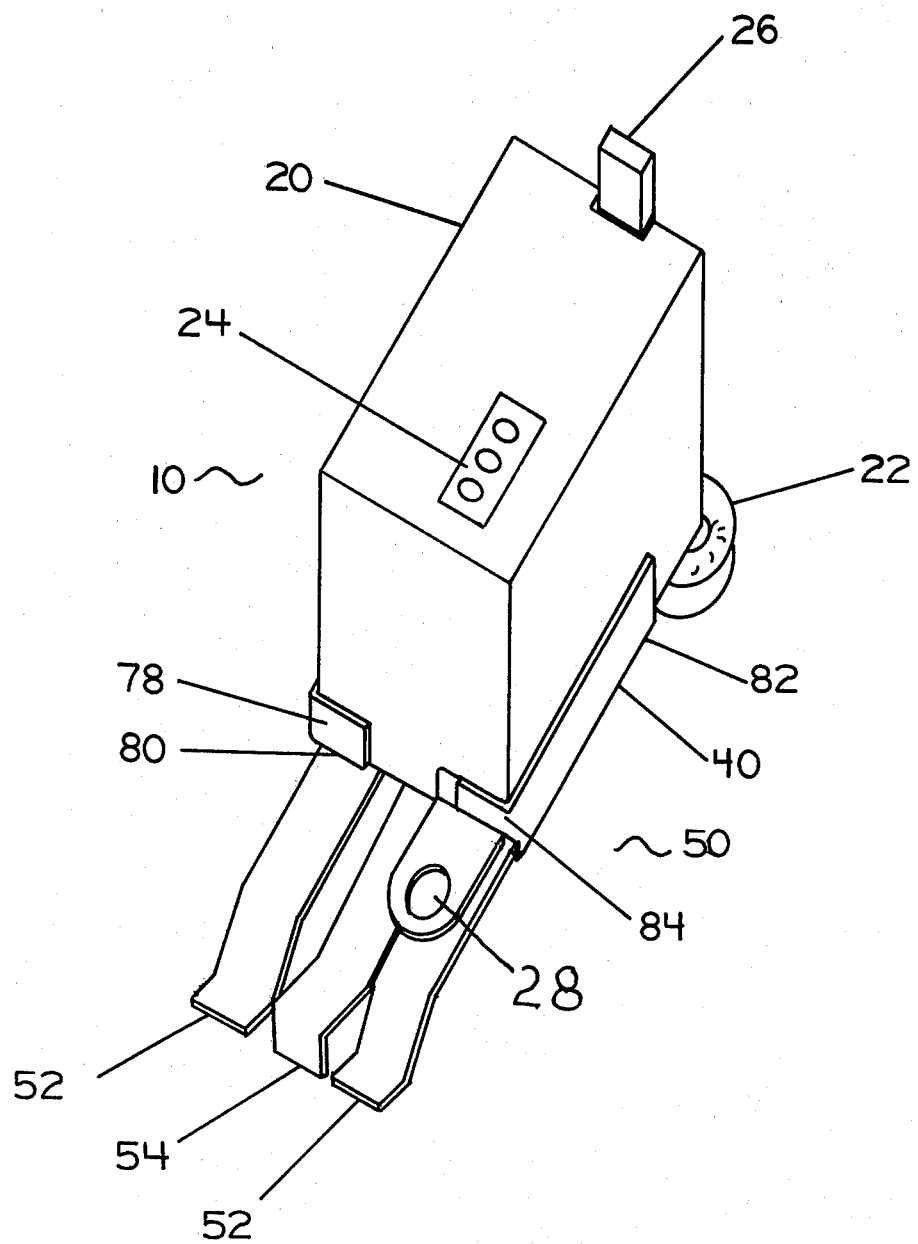
Fig. I

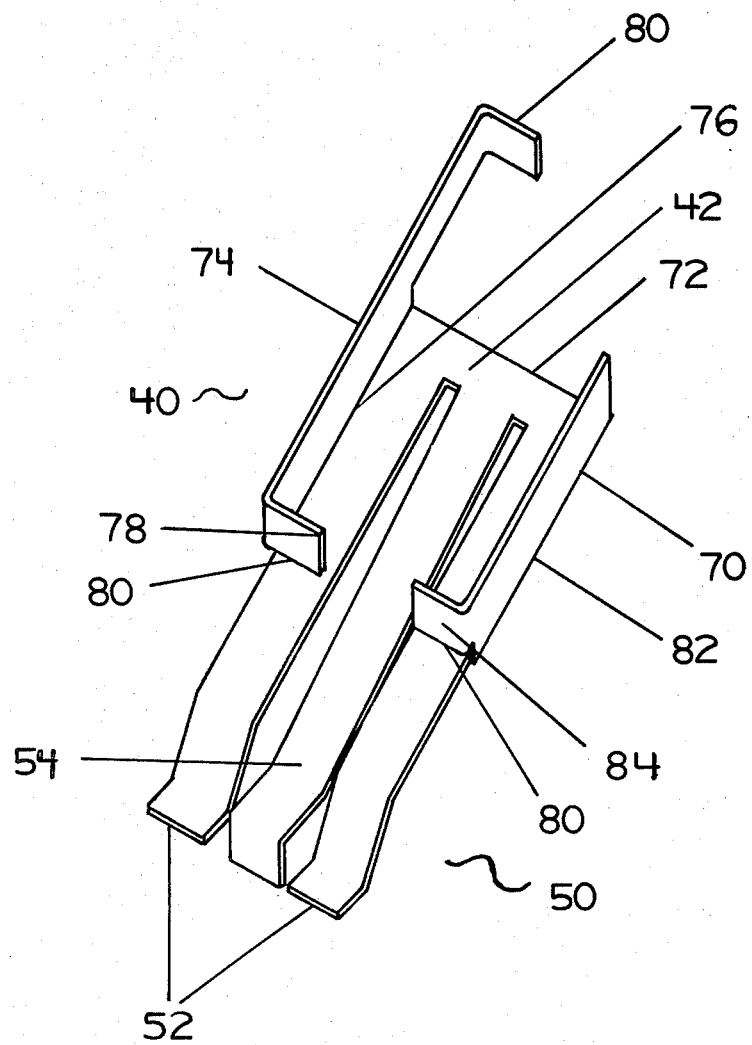
Fig. II

LINE LENGTH MEASURING DEVICE

CROSS-REFERENCE TO RELATED APPLICATION

This application is a continuation in part of now abandoned U.S. patent application Ser. No. 088,009; filed Oct. 25, 1979; by Daniel D. Call, the same inventor named in this application.

BACKGROUND OF THE INVENTION

This invention relates to an apparatus for determining the length of a line, and more particularly fishing line, and an apparatus and method for determining the amount of line, especially fishing line, paid out.

When using line or rope, it is usually desirable to know the length thereof. While such a determination is sometimes a simple matter, it can be a difficult porblem. It is, therefore, desirable to provide a simpler method or apparatus for making these desired determinations.

Even with the development of many different types of devices, fishing is still more of an art than a science. Because of this artistic quality, fishing, even for sport, is a great challenge. It is, therefore, desirable to provide a device which will assist the fisherman in his efforts.

One of the clear facts developed over the years is that fish tend to congregate at certain depths for a variety of reasons. One of the clear reasons therefor is the temperature of the water at the various levels of the fishing area. Whatever the reason for fish congregating at various levels, it is desirable to achieve fishing at the depth where the fish are.

Many devices are known in the art for indicating the depth of fishing line. These devices are somewhat complicated and require chart readings or other calculations to achieve the appropriate depth determinations. It is clearly desirable to achieve to simplify these determinations.

Another problem with the art devices is that most of the art devices require a major effort to attach and remove most of the art devices from the rod. It is desirable to simplify this removal and attachment process. Such easy removal can provide for easy transfer of the depth measuring device from rod to rod, thereby providing greater use for the device.

Additionally, some of the art devices have a complicated assembly procedure, which adds to the cost of manufacture, and thence to the retail price. If the costs can be reduced while at the same time providing for device equally as strong and usable, great advantages can result.

Thus it may be seen that there are great advantages to a fishing line depth indicator which is simply read, and easily attached to and removed from a fishing rod.

SUMMARY OF THE INVENTION

Therefore, it is an object of this invention to provide an improved fishing depth gauge.

It is a further object of this invention to provide a fishing depth gauge which may be easily read.

It is a still further object of this invention to provide a fishing depth gauge which is easily attachable to a fishing rod.

Yet a further object of this invention is to provide a fishing depth gauge which is easily removable from a fishing rod.

Also, an object of this invention is to provide a process for determining the depth of a fishing line.

Another object of this invention is to provide an apparatus suitable for measuring the length of a line.

Still another object of this invention is to provide an apparatus for measuring the length of a line having ease of assembly.

These and other objects of this invention are met by providing an apparatus for use as a line measuring device, and especially for use as a fishing depth gauge, including a clip mounting bracket having at one end thereof, a rod mounting bracket and at the other end thereof a digital counter suitable for measuring the depth of fishing line.

BRIEF DESCRIPTION OF THE DRAWING

FIG. I is a perspective view of the fishing assembly 10.

FIG. II is a perspective view of the clip 40.

Throughout the specification and drawing figures which are a part hereof, the same numeral refers to the same part.

DESCRIPTION OF THE PREFERRED EMBODIMENTS

A fishing depth gauge is formed by mounting a digital counter 20 on a clip 40 so that counter 20 can be activated by fishing line (not shown) used on a fishing rod (not shown). Gauge 20 may be used for measuring line or rope other than fishing line.

For the sake of simplification, the apparatus is described as a fishing depth gauge even though it has many other uses.

Turning to FIG. I of the drawing, fishing depth gauge 10 is shown in perspective view showing digital counter 20 mounted on clip 40. Digital counter 20 is a standard device available on the open market, which requires minimal description, and includes a line activating pulley 22 which is spun by fishing line (not shown) and activates digital display 24 by means of a worm gear device (not shown). Reset lever 26 permits gauge 10 to be reset to zero by gearing mechanism (not shown). Digital counter 20 is readily available on the market, and need not be further described here.

While parts of clip 40 are shown in FIG. I, FIG. II provides a more complete view of clip 40. FIG. II shows clip 40 from a clip top side 42. Clip 40 has a trifurcated rod mounting end 50 and a counter mounting end 70.

Rod mounting end 50 includes two, substantially symmetrical, lateral prongs 52 occupying substantially the same planes and a central prong 54 between the two lateral prongs 52. Central prong 54 is substantially symmetrical to lateral prongs 52, but is oppositely disposed therefrom. In other words, central prong 54 is not in the same plane as lateral prongs 52. This different disposition permits lateral prongs 52 to cooperate with central prong 54 and form trifurcated, rod mounting end 50. Thus rod mounting end 50 fits on a fishing rod not shown) so that fishing line (not shown) may contact activate line activating pulley 22 and cause digital display 24 to have a readout indicating the amount of fishing line paid out.

Opposite trifurcated rod mounting end 50 of clip 40 is counter mounting end 70. Included in counter mounting end 70 is counter base 72 on which part of the bottom of digital counter 20 rests. Counter base 72 is of sufficient size to support digital counter 20, but need not completely cover the base of counter 20.

Elongated flange 74 is attached to counter base 72 and perpendicular thereto at an edge 76. Elongated flange 74 extends beyond base 72 in a direction opposite lateral prongs 52. Elongated flang 72 is of sufficient length to correspond to the length of counter 20. Thus, except for the point at edge 76, flange 74 is essentially a flat bar-like piece.

Elongated flange 74 terminates at one end above lateral prongs 52 in front elongated counter holder 78. Front elongated counter holder 78 is substantially perpendicular to elongated flange 74 and is bent inwardly over lateral prong 52. At the bottom of counter holder 78 is a counter receiving notch 80. Counter receiving notch 80 is above lateral prong 52 and is positioned so that counter holder 78 is not as wide as elongated flange 74. Notch 80 is purely optional and is used herein to provide for aperture 28 of counter 20. Aperture 28 protrudes from counter 20, which is a commercially available item. It is easier to modify the clip of this invention than to modify counter 20. Of course, should a different counter be used, notch 80 may not be necessary.

At the other end of elongated flange 74 opposite front elongated counter holder 78, is rear elongated counter holder 82. Rear elongated counter holder 82 also includes a counter receiving notch 80 of the same characteristics as the other notch 80. Rear elongated counter holder 82 cooperates with front elongated counter holder 78 to position counter 20 on clip 40 abutting against elongated flange 74.

Opposite elongated flange 74 is shortened flange 82. Elongated flange 74 and shortened flange 82 cooperate to hold counter 20 in position on clip 40. Shortened flange 82 is also perpendicular to counter base 42 over one of lateral prongs 52 while elongated flange 74 extends over the other lateral prong 52. However, there is no rear part of shortened flange 82 which corresponds to the rear portion of elongated flange 74. On the other hand shortened flange 82 does include a shortened front counter holder 84. Shortened front counter holder 84 may optionally include notch 80 for the same reasons above-described.

Elongated flange 74 including front elongated counter holder 78 and rear elongated counter holder 80, and shortened flange 82 including front shortened counter holder 84 cooperate to hold counter 20 in a fixed position. Base 72 accomodates line activating pulley 22 in any suitable fashion.

In a preferred method of manufacture, clip 40 is cut in blank from a flat piece of metal or other suitable material. Appropriate bends are then made to form rod mounting end 50 including lateral prongs 52 and central prong 54. Elongated flange 74 is then bent upwardly on topside 42. Front elongated counter holder 78 and rear elongated counter holder 82 is then formed by appropriate bending. Also shortened flang 82 is bent upwardly on topside 42 and is formed with shortened flange counter holder 84. Digital counter 20 can then slide on to base 72 by a slight springlike outward bend of rear elongated counter holder 84. Once counter 20 is in place, rear elongated counter 84 holder reacts with a spring-like return to its position to permit counter 20 to be held in place.

What is claimed and sought to be secured by Letters Patent of the United States is:

1. In an apparatus for determining the amount of fishing line in use, wherein said apparatus includes a digital counter activated by said line and a flat, clip mounting means having said digital counting means secured thereto, the improvement wherein:
   a. said flat clip mounting means has a counting end at a first end thereof and a rod mating means capable of being secured to a fishing rod at a second end thereof;
   b. said digital counter is secured to a topside of said counting end;
   c. said rod mating means is trifurcated and includes two lateral prongs, a central prong between said two lateral prongs;
   d. said two lateral prongs are substantially symmetrical and occupy substantially the same planes;
   e. said central prong is substantially symmetrical to said lateral prongs, but oppositely disposed therefrom to thereby permit said central prong to cooperate with said two lateral prongs to mount said apparatus as desired;
   f. said mounting means has said topside in contact with a bottom side of said digital counting means;
   g. an elongated flange is substantially perpendicular to said topside;
   h. said elongated flange extends forward over one of said lateral prongs and rearwardly away from said topside to hold at least one side of said digital counting means;
   i. a shortened flange is substantially perpendicular to said topside and oppositely disposed from said elongated flange; and
   j. said shortened flange extends over one of said lateral prongs.

2. The apparatus of claim 1 wherein said shortened flange extends over one of said lateral prongs and terminates at a rear edge of said topside.

3. The apparatus of claim 2 wherein said shortened flange includes a shortened front counter holder to abut against an edge of said digital counting means mounted on said topside.

4. The apparatus of claim 3 wherein said elongated flange includes a front elongated counter holder oppositely disposed from said shortened front counter holder and said elongated flange further includes a rear elongated counter holder, said elongated flange being of sufficient length for said front elongated counter holder and said rear elongated counter holder to contact opposite ends of said digital counting means.

5. The apparatus of claim 4 wherein said shortened front counter holder is perpendicular to said shortened flange and is bent inwardly over one of said lateral prongs.

6. The apparatus of claim 5 wherein said shortened front counterholder is contiguous with a top edge of said shortened flange and is narrower than the width of said shortened flange.

7. The apparatus of claim 6 wherein said rear elongated counter holder and said front elongated counter are substantially similar in shape to said shortened front counter holder.

* * * * *